July 25, 1950  C. L. HAMM  2,516,567
VERTICAL SHAFT MOTOR
Filed Dec. 15, 1945
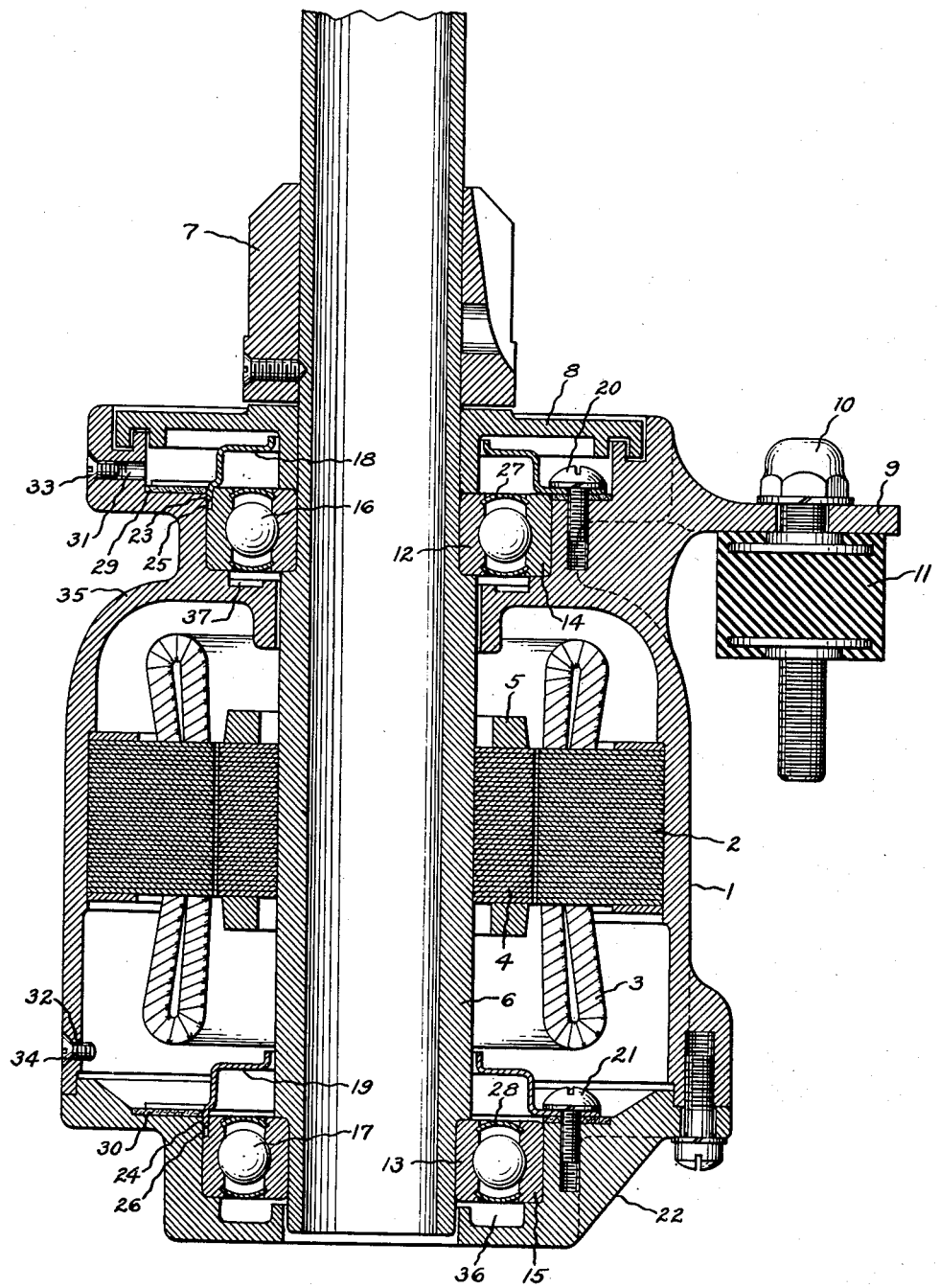
Inventor:
Clarence L. Hamm,
by Provell S Mack
His Attorney.

Patented July 25, 1950

2,516,567

UNITED STATES PATENT OFFICE 2,516,567

VERTICAL SHAFT MOTOR

Clarence L. Hamm, Marblehead, Mass., assignor to General Electric Company, a corporation of New York Application December 15, 1945, Serial No. 635,297

6 Claims. (Cl. 308—187)

My invention relates to electric motors and particularly to an improved bearing construction for this type machine.

An object of my invention is to provide an improved electric motor construction.

Another object of my invention is to provide an improved bearing unit particularly useful for a vertically extending rotatable member.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing is a sectional elevational view through a vertical shaft motor provided with an embodiment of my invention.

Referring to the drawing, I have shown an embodiment of my invention in connection with a spinning bobbin motor provided with a stationary member 1 having a laminated core portion 2 of magnetic material adapted to be excited by a winding 3 arranged to react electro-dynamically with a rotatable member including a laminated core 4 of magnetic material in which a squirrel cage winding 5 is arranged. The rotatable member core 4 is mounted on a vertically extending hollow shaft 6 which is provided with a bobbin support 7 and a deflector plate 8 arranged above the upper portion of the stationary motor frame 1. In order to cushion vibration and to support the motor on a suitable frame, a plurality of ears 9 are formed on the upper end of the motor frame 1 and are adapted to be secured to a frame by bolts 10 extending through cushioning pads 11 of resilient material, such as rubber. The vertically extending shaft of the rotatable member is supported by a bearing unit arranged on each side of the rotatable member, and these bearing units comprise any suitable grease-sealed antifriction type bearing and are shown as including inner races 12 and 13 arranged in engagement with the shaft 6 and outer races 14 and 15 which are fixedly mounted on the stationary member 1 of the motor. A plurality of antifriction bearing elements 16 and 17, respectively, are arranged between the races of the upper and lower bearings, and a lubricant reservoir is formed above each of the bearings by suitable casings 18 and 19 which are formed with a running clearance at the upper ends thereof with the rotatable member shaft and spaced from the inner bearing races to prevent interference with the free running of the rotatable member of the machine. These casings 18 and 19 are secured in position in any suitable manner as by a plurality of screws 20 and 21 which threadedly engage openings in the stationary member casing 1 and the stationary member lower end shield 22. Punched fingers 23 and 24 are formed on the casings 18 and 19 which project into notches 25 and 26 in the outer periphery of the outer bearing races 14 and 15, respectively, for preventing rotation of these outer races relative to the stationary member of the machine.

With this arrangement, lubrication of the bearings is accomplished by placing grease above the bearing in casings 18 and 19. Rotation of the shaft 6 and heat generated by the electrical and friction losses causes oil from the grease to seep or bleed slowly into the bearings through the fits of the bearing shields or guards 27 and 28 with the races 12 and 14 and 13 and 15, respectively, into the bearings arranged directly below the casing reservoirs 18 and 19, while at the same time the fit of said bearing shields with said races is such that the passage of grease from said reservoirs to said bearings is prevented. The motor shown is designed for grease within the lubricant casings 18 and 19, but tests indicate oils suspended in felt washers inserted in the casings 18 and 19 work equally as well. Under high speed conditions, this system allows the use of sealed bearings with very little lubricant inside them, thus resulting in low friction and no run-in period of several hours as is usually required with ordinary grease packed bearings. Under steady high speed running conditions, it is possible that the centrifugal force due to the rotation of the bearings may tend to force some of the oil out from under the lubricant reservoir casings 18 and 19 and, therefore, seals 29 and 30 formed by gaskets of suitable lubricant-resisting material, such as cork or neoprene, are arranged under the outwardly extending flanges of the casings 18 and 19 and are secured in position by the casing screws 20 and 21. In some installations, it may be found desirable to replenish the supply of oil to the lubricant reservoirs above the bearings, and lubricating oil supply passages 31 and 32 are formed through the stationary member 1, such that lubricating oil can be supplied through these openings to the space around the reservoir casings 18 and 19 for passage over the upwardly extending inner edges of these casings. These lubricating oil supply openings are closed by suitable removable closures, such as screws 33 and 34 which threadedly engage these openings. The lower end shield 22 and upper end shield 35 of the stationary member are formed with oil-collecting reservoirs 36 and 37 below the bearings 16 and 17 to provide for the collection of used or excess oil which may pass from these bearings during normal operation of the machine. In most instances, it will be found that such oil-collecting reservoirs below the bearings will be adequate for the collection of all oil which passes from these bearings between such time as the motor may be dismantled for replenishment of the lubricant in the lubricant reservoirs above the bearings, and it will be found unnecessary to replenish the oil in the lubricant reservoirs, as when the oil in the lubricant in these reservoirs is substantially exhausted, it will be found more desirable to dismantle the machine and repack the reservoirs above the bearings with new lubricant.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A unit having a stationary member and a vertically extending rotatable member, a bearing comprising an inner race arranged in engagement with said rotatable member and an outer race fixedly mounted on said stationary member, antifriction bearing elements between said races, means including a lubricant reservoir casing arranged about said bearing providing for the slow passage of lubricating oil from said reservoir to said bearing elements, means for securing said reservoir casing to said stationary member, a notch in said outer race, and means including a finger projecting from said reservoir casing into said outer race notch for preventing rotation of said outer race.

2. A unit having a stationary member and a vertically extending rotatable member, a bearing comprising an inner race arranged in engagement with said rotatable member and an outer race fixedly mounted on said stationary member, antifriction bearing elements between said races, means including a lubricant reservoir casing arranged above said bearing providing for the slow passage of lubricating oil from said reservoir to said bearing elements, a lubricant-resistant seal arranged between said reservoir casing and said stationary member, means for securing said reservoir casing and seal to said stationary member, a notch in said outer race, and means including a finger projecting from said reservoir casing into said outer race notch for preventing rotation of said outer race.

3. A vertical shaft motor having a stationary member and a rotatable member mounted on a vertically extending shaft, means including a bearing unit arranged on each side of said rotatable member for supporting said shaft, each of said bearing units comprising an inner race arranged in engagement with said shaft and an outer race mounted on said stationary member, antifriction bearing elements between said races, means including a grease reservoir casing arranged above said bearing providing for the slow passage of lubricating oil from grease in said reservoir to said bearing elements, means for securing said reservoir casing to said stationary member, and means including a finger projecting from said reservoir casing into engagement with said outer race for preventing rotation of said outer race.

4. A unit having a stationary member and a vertically extending rotatable member, a bearing comprising an inner race arranged in engagement with said rotatable member and an outer race mounted on said stationary member, antifriction bearing elements between said races, means including a grease reservoir casing arranged above said bearing providing for the slow passage of lubricating oil from grease in said reservoir to said bearing elements, a lubricant-resistant seal arranged between said reservoir casing and said stationary member, means for securing said reservoir casing and seal to said stationary member, a notch in said outer race, means including a finger projecting from said reservoir casing into said outer race notch for preventing rotation of said outer race, and means including a lubricating oil supply passage through said stationary member with a removable closure therefor providing for replenishment of oil to grease in said reservoir.

5. A vertical shaft motor having a stationary member and a rotatable member mounted on a vertically extending shaft, means including a bearing unit arranged on each side of said rotatable member for supporting said shaft, each of said bearing units comprising an inner race arranged in engagement with said shaft and an outer race fixedly mounted on said stationary member, antifriction bearing elements between said races, means including a lubricant reservoir casing arranged above said bearing providing for the slow passage of lubricating oil from said reservoir to said bearing elements, a lubricant-resistant seal arranged between said reservoir casing and said stationary member, means for securing said reservoir casing and seal to said stationary member, a notch in said outer race, and means including a finger projecting from said reservoir casing into said outer race notch for preventing rotation of said outer race.

6. A unit having a stationary member and a vertically extending rotatable member, a bearing comprising an inner race arranged in engagement with said rotatable member and an outer race mounted on said stationary member, antifriction bearing elements between said races, a casing within said stationary member and providing within it a lubricant reservoir, said casing also defining with said stationary member a space around said casing and interconnected with said reservoir, means including a lubricating oil supply passage through said stationary member providing for the introduction of lubricating oil to said space, and capillary means including grease located in said reservoir and providing for the slow passage of lubricating oil to said bearing elements.

CLARENCE L. HAMM.

REFERENCES CITED

The following references are of record in the file of this patent:

UNITED STATES PATENTS

| Number | Name | Date |
| --- | --- | --- |
| 1,367,519 | Sharpe | Feb. 1, 1921 |
| 1,724,902 | Bentley | Aug. 20, 1929 |
| 1,816,507 | Wilde | July 28, 1931 |
| 1,996,610 | Bott | Apr. 2, 1935 |
| 2,170,036 | Schumann | Aug. 22, 1939 |
| 2,221,457 | Pope | Nov. 12, 1940 |
| 2,249,501 | Teker | July 15, 1941 |
| 2,272,554 | Gilbert | Feb. 10, 1942 |